(12) United States Patent
Cao et al.

(10) Patent No.: US 11,990,073 B2
(45) Date of Patent: May 21, 2024

(54) LIGHT-EMISSION CONTROL SIGNAL GENERATION CIRCUITRY AND METHOD, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Xilei Cao, Beijing (CN); Yingsong Xu, Beijing (CN); Jingyi Feng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/769,638

(22) PCT Filed: Jun. 9, 2021

(86) PCT No.: PCT/CN2021/099111
§ 371 (c)(1),
(2) Date: Apr. 15, 2022

(87) PCT Pub. No.: WO2021/249427
PCT Pub. Date: Dec. 16, 2021

(65) Prior Publication Data
US 2024/0135848 A1 Apr. 25, 2024

(30) Foreign Application Priority Data
Jun. 10, 2020 (CN) .......................... 202010522594.8

(51) Int. Cl.
*G09G 3/20* (2006.01)

(52) U.S. Cl.
CPC ....... *G09G 3/20* (2013.01); *G09G 2300/0861* (2013.01); *G09G 2310/0243* (2013.01); *G09G 2330/021* (2013.01)

(58) Field of Classification Search
None
See application file for complete search history.

(56) References Cited

U.S. PATENT DOCUMENTS

2011/0273418 A1 11/2011 Park
2012/0176417 A1* 7/2012 Jang ..................... G11C 19/184
345/77

(Continued)

FOREIGN PATENT DOCUMENTS

CN 107657918 A 2/2018
CN 108735151 A 11/2018

(Continued)

OTHER PUBLICATIONS

PCT/CN2021/099111international search report and written opinion.

*Primary Examiner* — Dorothy Harris
(74) *Attorney, Agent, or Firm* — IPro, PLLC

(57) ABSTRACT

The present disclosure provides a light-emission control signal generation circuitry, a light-emission control signal generation method and a display device. The light-emission control signal generation circuitry includes a first control node control circuitry, a second control node control circuitry, a first node control circuitry, a second node control circuitry and an output circuitry. The first control node control circuitry is configured to control a potential at a first control node to be a first voltage at a first stage; the second control node control circuitry is configured to control a second control node to be electrically decoupled from the first control node at the first stage; and the output circuitry (Continued)

is configured to generate a light-emission control signal under the control of a potential at a first node and a potential at a second node.

20 Claims, 8 Drawing Sheets

(56) References Cited

U.S. PATENT DOCUMENTS

| | | | |
|---|---|---|---|
| 2016/0329015 A1* | 11/2016 | Ji | ............................... G09G 3/32 |
| 2017/0206824 A1* | 7/2017 | Sun | ....................... G09G 3/3266 |
| 2018/0047344 A1* | 2/2018 | Sun | ....................... G11C 19/186 |
| 2018/0075923 A1* | 3/2018 | Ma | .......................... G11C 19/28 |
| 2018/0130407 A1 | 5/2018 | Zhai | |
| 2019/0340975 A1 | 11/2019 | Zhai | |
| 2020/0302870 A1* | 9/2020 | Jang | ....................... G09G 3/3258 |
| 2021/0217341 A1* | 7/2021 | Huang | ................... G11C 19/28 |
| 2021/0366354 A1* | 11/2021 | Li | ........................ G09G 3/3266 |

FOREIGN PATENT DOCUMENTS

| | | |
|---|---|---|
| CN | 209265989 U | 8/2019 |
| CN | 111768733 A | 10/2020 |
| KR | 20170089997 A | 8/2017 |

* cited by examiner

US 11,990,073 B2

LIGHT-EMISSION CONTROL SIGNAL GENERATION CIRCUITRY AND METHOD, AND DISPLAY DEVICE

CROSS-REFERENCE TO RELATED APPLICATION

This application is the U.S. national phase of PCT Application No. PCT/CN2021/099111 filed on Jun. 9, 2021, which claims a priority of the Chinese patent application No. 202010522594.8 filed on Jun. 10, 2020, which is incorporated herein by reference in its entirety.

TECHNICAL FIELD

The present disclosure relates to the field of display technology, in particular to a light-emission control signal generation circuitry, a light-emission control signal generation method and a display device.

BACKGROUND

When a display panel operates in a low-frequency mode, a refresh rate may be, for example, 1 Hz, i.e., one frame is refreshed per second. A display time of one image includes a compensation time period and a light-emitting time period. In the low-frequency mode, the light-emitting time period occupies for more than 85% of the display time of one image, and in the light-emitting time period, a potential of a light-emission control signal is an effective potential. In the related art, a clock signal is always switched between high frequency and low frequency in the light-emitting time period, but a waveform of the output light-emission control signal is not greatly affected, resulting in an increase in the power consumption.

SUMMARY

In one aspect, the present disclosure provides in some embodiments a light-emission control signal generation circuitry, including a first control node control circuitry, a second control node control circuitry, a first node control circuitry, a second node control circuitry and an output circuitry. The first control node control circuitry is configured to control a potential at a first control node to be a first voltage; the second control node control circuitry is configured to control a second control node to be electrically coupled to or electrically decoupled from the first control node; the first node control circuitry is configured to control a potential at a first node under the control of the potential at the first control node; the second node control circuitry is configured to control a potential at a second node under the control of the potential at the first control node and the potential at the first node; and the output circuitry is configured to generate a light-emission control signal under the control of the potential at the first node and the potential at the second node.

In a possible embodiment of the present disclosure, the first control node control circuitry includes a first control transistor, a control electrode of the first control transistor is electrically coupled to a first control end, a first electrode of the first control transistor is electrically coupled to a second control end or a first voltage end, a second electrode of the first control transistor is electrically coupled to the first control node, and the first control transistor is a p-type transistor.

In a possible embodiment of the present disclosure, the first control transistor is turned on to control the potential at the first control node to be the first voltage which is a high voltage when the first control end provides a low voltage signal and the second control end or the first voltage end provides a high voltage signal.

In a possible embodiment of the present disclosure, the first control node control circuitry includes a first control transistor, a control electrode of the first control transistor is electrically coupled to a second control end, a first electrode of the first control transistor is electrically coupled to a first voltage end, a second electrode of the first control transistor is electrically coupled to the first node, and the first control transistor is an n-type transistor.

In a possible embodiment of the present disclosure, the first control transistor is turned on to control the potential at the first control node to be the first voltage which is a high voltage when the second control end provides a high voltage signal and the first voltage end provides a high voltage signal.

In a possible embodiment of the present disclosure, the second control node control circuitry is further configured to write a second voltage signal into the second control node under the control of a first clock signal, and write the first clock signal into the second control node under the control of a potential at the third node.

In a possible embodiment of the present disclosure, the second control node control circuitry includes a second control transistor, a third control transistor and a fourth control transistor. A control electrode of the second control transistor is electrically coupled to the second control end, a first electrode of the second control transistor is electrically coupled to the second control node, and a second electrode of the second control transistor is electrically coupled to the first control node. A control electrode of the third control transistor is electrically coupled to a first clock signal end, a first electrode of the third control transistor is electrically coupled to a second voltage end, and a second electrode of the third control transistor is electrically coupled to the second control node. A control electrode of the fourth control transistor is electrically coupled to the third node, a first electrode of the fourth control transistor is electrically coupled to the first clock signal end, and a second electrode of the fourth control transistor is electrically coupled to the second control node.

In a possible embodiment of the present disclosure, the second control transistor is turned off to control the second control node to be electrically decoupled from the first control node when the first control end provides a low voltage signal and the second control end provides a high voltage signal. The second control transistor is turned on to control the second control node to be electrically coupled to the first control node when the first control end provides a high voltage signal and the second control end provides a low voltage signal.

In a possible embodiment of the present disclosure, the first node control circuitry is configured to write an initial voltage into the third node under the control of the first clock signal, write the first voltage into the third node under the control of the potential at the first control node and a second clock signal, control the third node to be electrically coupled to the first node under the control of the second voltage signal, and control the potential at the first node in accordance with the second clock signal.

In a possible embodiment of the present disclosure, the second node control circuitry is configured to control a potential at a fourth node in accordance with the potential at the first control node, write the second clock signal into the fourth node under the control of the potential at the first control node, control the fourth node to be electrically coupled to the second node under the control of the second clock signal, write the first voltage signal into the second node under the control of the potential at the first node, and maintain the potential at the second node.

In a possible embodiment of the present disclosure, the first node control circuitry includes a fifth control transistor, a sixth control transistor, a seventh control transistor, an eighth control transistor and a first capacitor. A control electrode of the fifth control transistor is electrically coupled to the first clock signal end, a first electrode of the fifth control transistor is electrically coupled to an initial voltage end, and a second electrode of the fifth control transistor is electrically coupled to the third node; a control electrode of the sixth control transistor is electrically coupled to a second clock signal end, and a first electrode of the sixth control transistor is electrically coupled to the third node; a control electrode of the seventh control transistor is electrically coupled to the first control node, a first electrode of the seventh control transistor is electrically coupled to a second electrode of the sixth control transistor, and a second electrode of the seventh control transistor is electrically coupled to the first voltage end; a control electrode of the eighth control transistor is electrically coupled to the second voltage end, a first electrode of the eighth control transistor is electrically coupled to the third node, and a second electrode of the eighth control transistor is electrically coupled to the first node; and a first end of the first capacitor is electrically coupled to the first node, and a second end of the first capacitor is electrically coupled to the second clock signal end.

In a possible embodiment of the present disclosure, the second node control circuitry includes a second capacitor, a ninth control transistor, a tenth control transistor, an eleventh control transistor and a third capacitor. A first end of the second capacitor is electrically coupled to the first control node, and a second end of the second capacitor is electrically coupled to the fourth node; a control electrode of the ninth control transistor is electrically coupled to the first control node, a first electrode of the ninth control transistor is electrically coupled to the second clock signal end, and a second electrode of the ninth control transistor is electrically coupled to the fourth node; a control electrode of the tenth control transistor is electrically coupled to the second clock signal end, a first electrode of the tenth control transistor is electrically coupled to the fourth node, and a second electrode of the tenth control transistor is electrically coupled to the second node; a control electrode of the eleventh control transistor is electrically coupled to the first node, a first electrode of the eleventh control transistor is electrically coupled to the first voltage end, and a second electrode of the eleventh control transistor is electrically coupled to the second node; and a first end of the third capacitor is electrically coupled to the second node, and a second end of the third capacitor is electrically coupled to the first voltage end.

In a possible embodiment of the present disclosure, the output circuitry includes a first output transistor and a second output transistor. A control electrode of the first output transistor is electrically coupled to the first node, a first electrode of the first output transistor is electrically coupled to the second voltage end, and a second electrode of the first output transistor is electrically coupled to a light-emission control signal output end; and a control electrode of the second output transistor is electrically coupled to the second node, a first electrode of the second output transistor is electrically coupled to the first voltage end, and a second electrode of the second output transistor is electrically coupled to the light-emission control signal output end.

In another aspect, the present disclosure further provides in some embodiments a light-emission control signal generation method for the above-mentioned light-emission control signal generation circuitry. A display period includes a light-emitting time period, and the light-emitting time period includes a first stage. The light-emission control signal generation method includes, at the first stage, enabling the first clock signal and the second clock signal to be direct current voltage signals, controlling, by the first control node control circuitry, the potential at the first control node to be the first voltage, controlling, by the second control node control circuitry, the second control node to be electrically decoupled from the first control node, controlling, by the first node control circuitry, the potential at the first node to be the second voltage under the control of the potential at the first control node, controlling, by the second node control circuitry, the potential at the second node to be the first voltage under the control of the potential at the first control node and the potential at the first node, and controlling, by the output circuitry, a potential of the light-emission control signal to be an effective potential under the control of the potential at the first node and the potential at the second node.

In yet another aspect, the present disclosure further provides in some embodiments a display device including the above-mentioned light-emission control signal generation circuitry.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
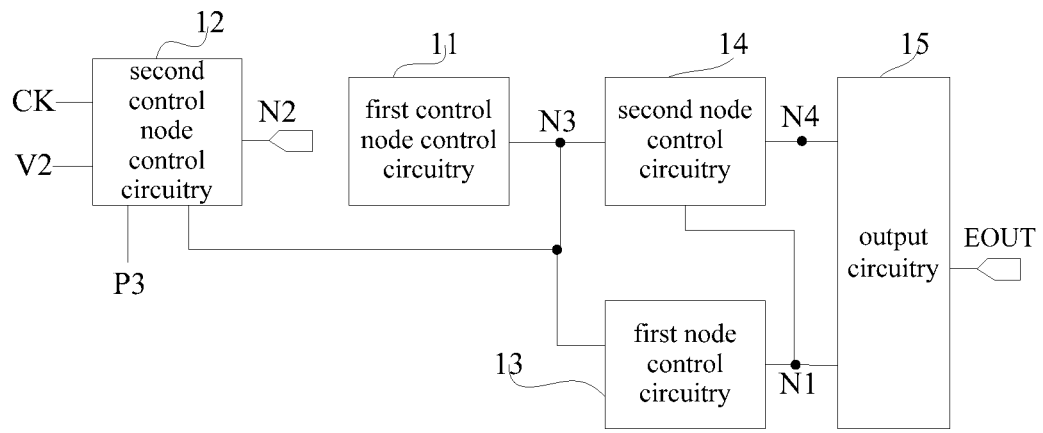
FIG. 1 is a schematic view showing a light-emission control signal generation circuitry according to one embodiment of the present disclosure.

As shown in FIG. 1, the present disclosure provides in some embodiments a light-emission control signal generation circuitry, including a first control node control circuitry 11, a second control node control circuitry 12, a first node control circuitry 13, a second node control circuitry 14 and an output circuitry 15. The first control node control circuitry 11 is electrically coupled to a first control node N3, and configured to control a potential at the first control node N3 to be a first voltage at a first stage; the second control node control circuitry 12 is electrically coupled to the first control node N3 and a second control node N2, configured to control the second control node N2 to be electrically decoupled from the first control node N3 at the first stage, and control the second control node N2 to be electrically coupled to the first control node N3 at a second stage; the first node control circuitry 13 is electrically coupled to the first control node N3 and a first node N1, and configured to control a potential at the first node N1 under the control of the potential at the first control node N3; the second node control circuitry 14 is electrically coupled to the first control node N3, the first node N1 and a second node N4, and configured to control a potential at a second node N4 under the control of the potential at the first control node N3 and the potential at the first node N1; and the output circuitry 15 is electrically coupled to the first node N1, the second node N4 and a light-emission control signal output end EOUT, and configured to generate a light-emission control signal under the control of the potential at the first node N1 and the potential at the second node N4 and output the light-emission control signal through the light-emission control signal output end EOUT.

According to the light-emission control signal generation circuitry in the embodiments of the present disclosure, the first control node control circuitry is added to improve the stability of the outputted light-emission control signal.

In the embodiments of the present disclosure, the first voltage is, but not limited to, a high voltage.

In the embodiments of the present disclosure, the first stage is, but not limited to, a time period within which each light-emission control line in a display panel provides an effective potential, and the second stage is, but not limited to, a time period other than the first stage.

In the embodiments of the present disclosure, a display period includes a compensation time period and a light-emitting time period arranged in sequence, and the light-emitting time period includes an enabling stage and the first stage arranged in sequence. At the enabling stage, a plurality of light-emission control lines in the display panel to which the light-emission control signal generation circuitry in the embodiments of the present disclosure is applied is sequentially enabled. At the first stage, all the light-emission control lines in the display panel have been enabled. In the embodiments of the present disclosure, when the light-emission control line is enabled, it means that a potential of the light-emission control signal provided by the light-emission control line is an effective potential.

In the embodiments of the present disclosure, the second control node control circuitry is electrically coupled to a first clock signal end to control a potential at the second control node under the control of a first clock signal, the first node control circuitry is electrically coupled to the first clock signal end and a second clock signal end to control the potential at the first node under the control of the first clock signal and a second clock signal, and the second node control circuitry is electrically coupled to the second clock signal end to control a potential at a second node under the control of the second clock signal end. According to the light-emission control signal generation circuitry in the embodiments of the present disclosure, the first control node control circuitry is added to improve the stability of the outputted light-emission control signal, so as to change the first clock signal and the second clock signal into direct current voltage signals within a part of the light-emitting time period, thereby to reduce the power consumption while ensuring the output stability of the light-emission control signal.

Within the light-emitting time period, the potential of the light-emission control signal is the effective potential.

In the embodiments of the present disclosure, when a light-emission control transistor (a control electrode of the light-emission control transistor is configured to receive the light-emission control signal) in a pixel circuitry is a p-type transistor, the effective potential is a low voltage; and when the light-emission control transistor is an n-type transistor, the effective potential is a high potential.

In the embodiments of the present disclosure, the first control node control circuitry includes a first control transistor, a control electrode of the first control transistor is electrically coupled to a first control end, a first electrode of the first control transistor is electrically coupled to a second control end or a first voltage end, a second electrode of the first control transistor is electrically coupled to the first control node, and the first control transistor is a p-type transistor.

Figure 2:
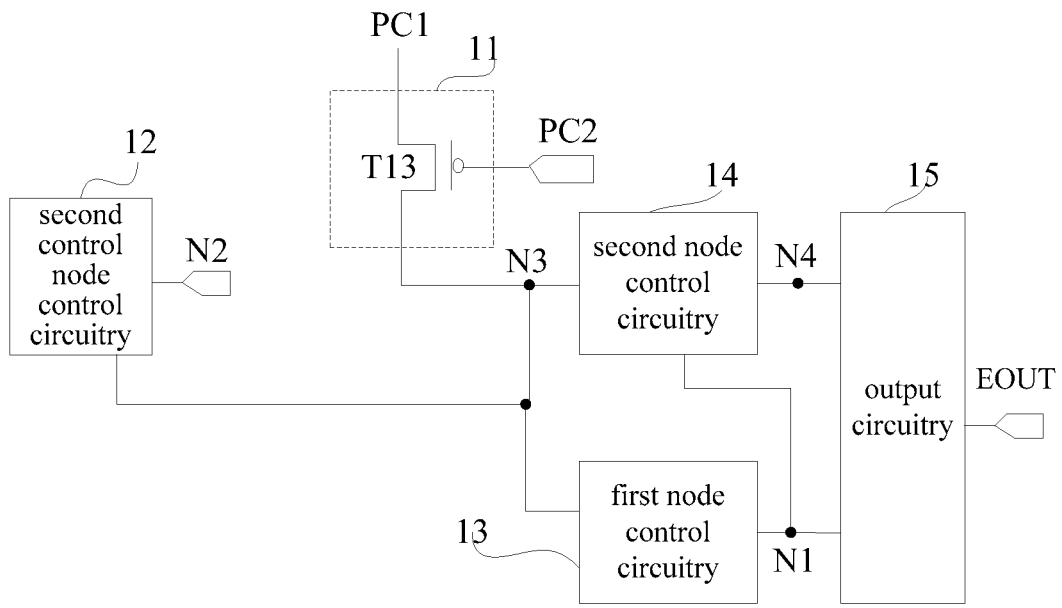
FIG. 2 is another schematic view showing the light-emission control signal generation circuitry according to one embodiment of the present disclosure.

As shown in FIG. 2, based on the light-emission control signal generation circuitry in FIG. 1, the first control node control circuitry 11 includes a first control transistor T13, a gate electrode of the first control transistor T13 is electrically coupled to a first control end PC2, a source electrode of the first control transistor T13 is electrically coupled to a second control end PC1, and a drain electrode of the first control transistor T13 is electrically coupled to the first control node N3.

In FIG. 2, T13 is, but not limited to, a p-type Metal-Oxide-Semiconductor (PMOS) transistor.

In the embodiments of the present disclosure, as shown in FIG. 2, during the operation of the light-emission control signal generation circuitry, PC2 provides a low voltage signal and PC1 provides a high voltage signal at the first stage, so T13 is turned on, and the potential at N3 is a high voltage.

In the embodiments of the present disclosure, as shown in FIG. 2, during the operation of the light-emission control signal generation circuitry, when PC2 provides a high voltage signal, T13 is turned off.

In the embodiments of the present disclosure, the first control node control circuitry includes a first control transistor, a control electrode of the first control transistor is electrically coupled to a second control end, a first electrode of the first control transistor is electrically coupled to a first voltage end, a second electrode of the first control transistor is electrically coupled to the first node, and the first control transistor is an n-type transistor.

Figure 3:
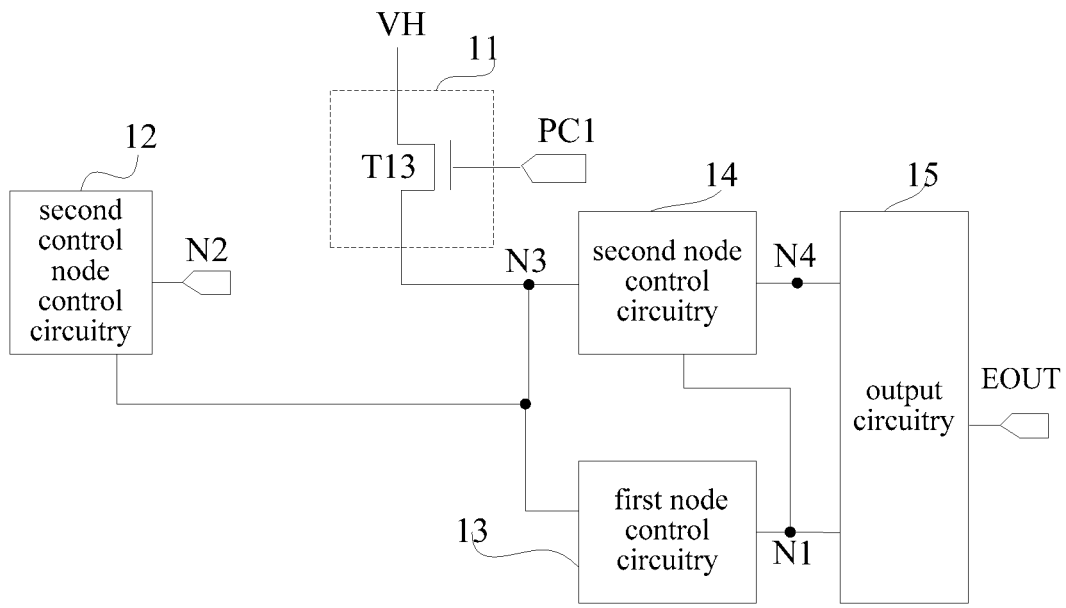
FIG. 3 is yet another schematic view showing the light-emission control signal generation circuitry according to one embodiment of the present disclosure.

As shown in FIG. 3, based on the light-emission control signal generation circuitry in FIG. 1, the first control node control circuitry 11 includes a first control transistor T13, a gate electrode of the first control transistor T13 is electrically coupled to the second control end PC1, a drain electrode of the first control transistor T13 is electrically coupled to a high voltage end VH, and a source electrode of the first control transistor T13 is electrically coupled to the first control node N3.

In FIG. 3, T13 is, but not limited to, an n-type Metal-Oxide-Semiconductor (NMOS) transistor.

In the embodiments of the present disclosure, as shown in FIG. 3, during the operation of the light-emission control signal generation circuitry, PC1 provides a high voltage signal at the first stage, so T13 is turned on, and the potential at N3 is a high voltage.

In the embodiments of the present disclosure, as shown in FIG. 3, during the operation of the light-emission control signal generation circuitry, when PC1 provides a low voltage signal, T13 is turned off.

In the embodiments of the present disclosure, the second control node control circuitry is further configured to write a second voltage signal into the second control node under the control of a first clock signal, and write the first clock signal into the second control node under the control of a potential at the third node.

Figure 4:
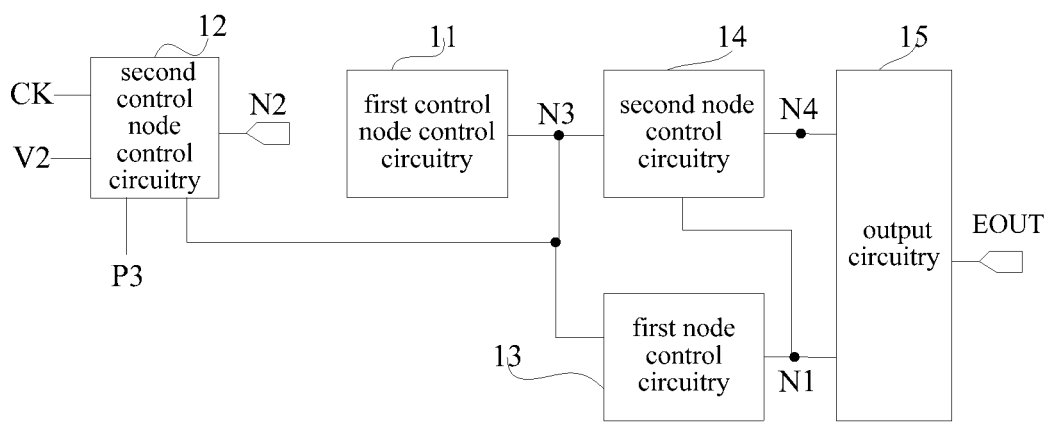
FIG. 4 is still yet another schematic view showing the light-emission control signal generation circuitry according to one embodiment of the present disclosure.

As shown in FIG. 4, based on the light-emission control signal generation circuitry in FIG. 1, the second control node control circuitry 12 is further electrically coupled to the first clock signal end, a second voltage end V2 and the third node P3, and configured to write the second voltage signal into the second control node N2 under the control of the first clock signal CK, and write the first clock signal CK into the second control node N2 under the control of the potential at the third node P3. The first clock signal end is configured to provide the first clock signal CK, and the second voltage end V2 is configured to provide the second voltage signal.

In the embodiments of the present disclosure, the second voltage end is, but not limited to, a low voltage end, and the second voltage signal is, but not limited to, a low voltage signal.

In the embodiments of the present disclosure, the second control node control circuitry includes a second control transistor, a third control transistor, and a fourth control transistor. A control electrode of the second control transistor is electrically coupled to the second control end, a first electrode of the second control transistor is electrically coupled to the second control node, and a second electrode of the second control transistor is electrically coupled to the first control node; a control electrode of the third control transistor is electrically coupled to a first clock signal end, a first electrode of the third control transistor is electrically coupled to a second voltage end, and a second electrode of the third control transistor is electrically coupled to the second control node; and a control electrode of the fourth control transistor is electrically coupled to the third node, a first electrode of the fourth control transistor is electrically coupled to the first clock signal end, and a second electrode of the fourth control transistor is electrically coupled to the second control node.

In the embodiments of the present disclosure, the first node control circuitry is configured to write an initial voltage into the third node under the control of the first clock signal, write the first voltage into the third node under the control of the potential at the first control node and a second clock signal, control the third node to be electrically coupled to the first node under the control of the second voltage signal, and control the potential at the first node in accordance with the second clock signal.

In the embodiments of the present disclosure, the second node control circuitry is configured to control a potential at a fourth node in accordance with the potential at the first control node, write the second clock signal into the fourth node under the control of the potential at the first control node, control the fourth node to be coupled to the second node under the control of the second clock signal, write the first voltage signal into the second node under the control of the potential at the first node, and maintain the potential at the second node.

Figure 5:
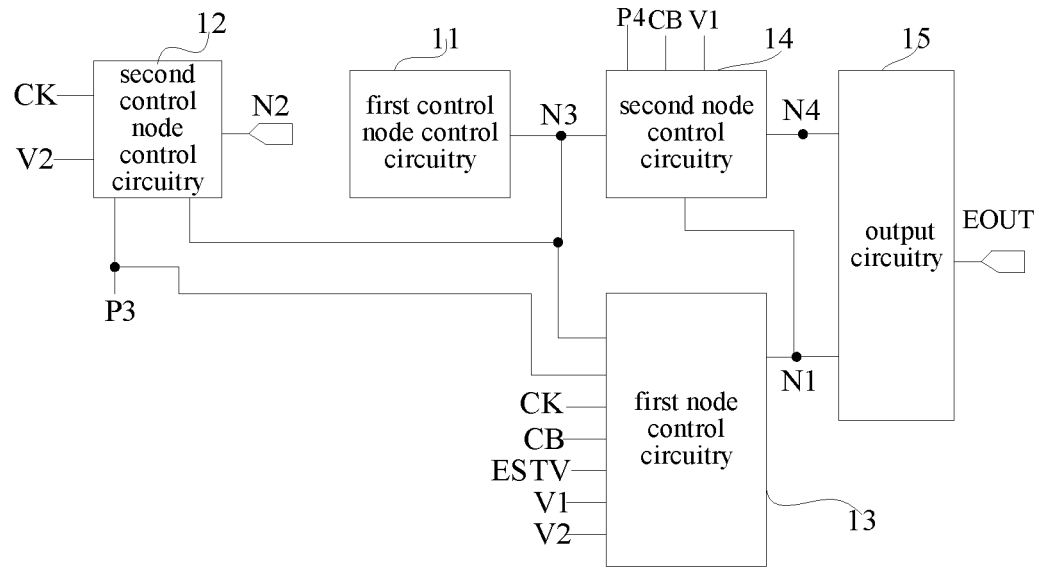
FIG. 5 is still yet another schematic view showing the light-emission control signal generation circuitry according to one embodiment of the present disclosure.

As shown in FIG. 5, based on the light-emission control signal generation circuitry in FIG. 4, the first node control circuitry 13 is electrically coupled to the first clock signal end, an initial voltage end ESTV, the third node P3, the first control node N3, the second clock signal end, the first voltage end V1, the second voltage end V2 and the first node N1, configured to write the initial voltage into the third node P3 under the control of the first clock signal CK, write the first voltage into the third node P3 under the control of the potential at the first control node N3 and the second clock signal CB, control the third node P3 to be electrically coupled to the first node N1 under the control of the second voltage signal, and control the potential at the first node N1 in accordance with the second clock signal CB. The initial voltage end ESTV is configured to provide the initial voltage, the first clock signal end is configured to provide the first clock signal CK, the second clock signal end configured to provide the second clock signal CB, the first voltage end V1 is configured to provide the first voltage signal, and the second voltage end V2 configured to provide the second voltage signal.

The second node control circuitry 14 is electrically coupled to the first control node N3, the fourth node P4, the second clock signal end, the second node N4, the first node N1 and the first voltage end V1, and configured to control the potential at the fourth node P4 in accordance with the potential at the first control node N3, write the second clock signal CB into the fourth node P4 under the control of the potential at the first control node N3, control the fourth node P4 to be electrically coupled to the second node N4 under the control of the second clock signal CB, write the first voltage signal into the second node N4 under the control of the potential at the first node N1, and maintain the potential at the second node N4.

In the embodiments of the present disclosure, the first node control circuitry includes a fifth control transistor, a sixth control transistor, a seventh control transistor, an eighth control transistor and a first capacitor. A control electrode of the fifth control transistor is electrically coupled to the first clock signal end, a first electrode of the fifth control transistor is electrically coupled to an initial voltage end, and a second electrode of the fifth control transistor is electrically coupled to the third node; a control electrode of the sixth control transistor is electrically coupled to a second clock signal end, and a first electrode of the sixth control transistor is electrically coupled to the third node; a control electrode of the seventh control transistor is electrically coupled to the first control node, a first electrode of the seventh control transistor is electrically coupled to a second electrode of the sixth control transistor, and a second electrode of the seventh control transistor is electrically coupled to the first voltage end; a control electrode of the eighth control transistor is electrically coupled to the second voltage end, a first electrode of the eighth control transistor is electrically coupled to the third node, and a second electrode of the eighth control transistor is electrically coupled to the first node; and a first end of the first capacitor is electrically coupled to the first node, and a second end of the first capacitor is electrically coupled to the second clock signal end.

In the embodiments of the present disclosure, the second node control circuitry includes a second capacitor, a ninth control transistor, a tenth control transistor, an eleventh control transistor and a third capacitor. A first end of the second capacitor is electrically coupled to the first control node, and a second end of the second capacitor is electrically coupled to the fourth node; a control electrode of the ninth control transistor is electrically coupled to the first control node, a first electrode of the ninth control transistor is electrically coupled to the second clock signal end, and a second electrode of the ninth control transistor is electrically coupled to the fourth node; a control electrode of the tenth control transistor is electrically coupled to the second clock signal end, a first electrode of the tenth control transistor is electrically coupled to the fourth node, and a second electrode of the tenth control transistor is electrically coupled to the second node; a control electrode of the eleventh control transistor is electrically coupled to the first node, a first electrode of the eleventh control transistor is electrically coupled to the first voltage end, and a second electrode of the eleventh control transistor is electrically coupled to the second node; and a first end of the third capacitor is electrically coupled to the second node, and a second end of the third capacitor is electrically coupled to the first voltage end.

In the embodiments of the present disclosure, the output circuitry includes a first output transistor and a second output transistor. A control electrode of the first output transistor is electrically coupled to the first node, a first electrode of the first output transistor is electrically coupled to the second voltage end, and a second electrode of the first output transistor is electrically coupled to a light-emission control signal output end. A control electrode of the second output transistor is electrically coupled to the second node, a first electrode of the second output transistor is electrically coupled to the first voltage end, and a second electrode of the second output transistor is electrically coupled to the light-emission control signal output end.

Figure 6:
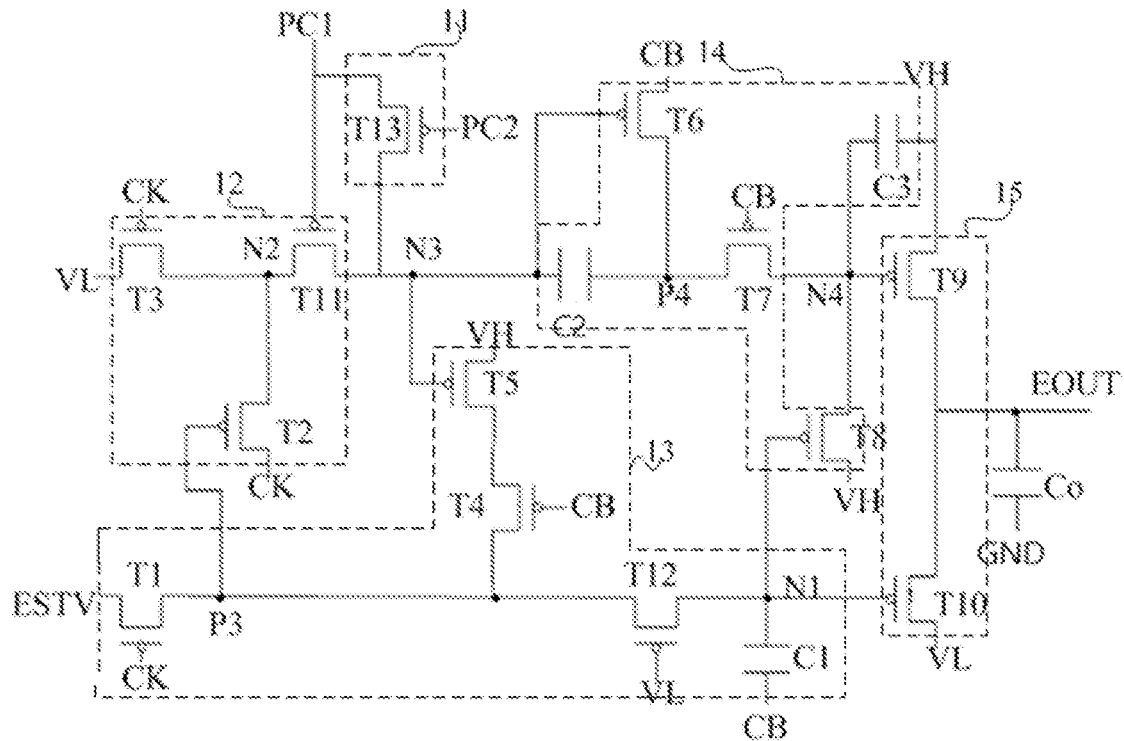
FIG. 6 is a circuit diagram of the light-emission control signal generation circuitry according to one embodiment of the present disclosure.

As shown in FIG. 6, based on the light-emission control signal generation circuitry in FIG. 5, the first control node control circuitry 11 includes a first control transistor T13. A gate electrode of the first control transistor T13 is electrically coupled to a first control end PC2, a source electrode of the first control transistor T13 is electrically coupled to a second control end PC1, and a drain electrode of the first control transistor T13 is electrically coupled to the first control node N3.

The second control node control circuitry 12 includes a second control transistor T11, a third control transistor T3, and a fourth control transistor T2. A gate electrode of the second control transistor T11 is electrically coupled to the second control end PC1, a source electrode of the second control transistor T11 is electrically coupled to the second control node N2, and a drain electrode of the second control transistor T11 is electrically coupled to the first control node N3; a gate electrode of the third control transistor T3 is electrically coupled to a first clock signal end, a source electrode of the third control transistor T3 is electrically coupled to a low voltage end, a drain electrode of the third control transistor T3 is electrically coupled to the second control node N2, and the low voltage end is configured to provide a low voltage VL; and a gate electrode of the fourth control transistor T2 is electrically coupled to the third node P3, a source electrode of the fourth control transistor T2 is electrically coupled to the first clock signal end, a drain electrode of the fourth control transistor T2 is electrically coupled to the second control node N2, and the first clock signal end is configured to provide the first clock signal CK.

The first node control circuitry 13 includes a fifth control transistor T1, a sixth control transistor T4, a seventh control transistor T5, an eighth control transistor T12 and a first capacitor C1. A gate electrode of the fifth control transistor T1 is electrically coupled to the first clock signal end, a source electrode of the fifth control transistor T1 is electrically coupled to the initial voltage end ESTV, and a drain electrode of the fifth control transistor T1 is electrically coupled to the third node P3; a gate electrode of the sixth control transistor T4 is electrically coupled to the second clock signal end, a source electrode of the sixth control transistor T4 is electrically coupled to the third node P3, and the second clock signal end is configured to provide the second clock signal CB; a gate electrode of the seventh control transistor T5 is electrically coupled to the first control node N3, a source electrode of the seventh control transistor T5 is electrically coupled to a drain electrode of the sixth control transistor T4, and a drain electrode of the seventh control transistor T5 is electrically coupled to a high voltage end, and the high voltage end is configured to provide a high voltage VH; a gate electrode of the eighth control transistor T12 is electrically coupled to the low voltage end, a source electrode of the eighth control transistor T12 is electrically coupled to the third node P3, and a drain electrode of the eighth control transistor T12 is electrically coupled to the first node N1; and a first end of the first capacitor C1 is electrically coupled to the first node N1, and a second end of the first capacitor C1 is electrically coupled to the second clock signal end.

The second node control circuitry 14 includes a second capacitor C2, a ninth control transistor T6, a tenth control transistor T7, an eleventh control transistor T8 and a third capacitor C3. A first end of the second capacitor C2 is electrically coupled to the first control node N3, and a second end of the second capacitor C2 is electrically coupled to the fourth node P4; a gate electrode of the ninth control transistor T6 is electrically coupled to the first control node N3, a source electrode of the ninth control transistor T6 is electrically coupled to the second clock signal end, and a drain electrode of the ninth control transistor T6 is electrically coupled to the fourth node P4; a gate electrode of the tenth control transistor T7 is electrically coupled to the second clock signal end, a source electrode of the tenth control transistor T7 is electrically coupled to the fourth node P4, and a drain electrode of the tenth control transistor T7 is electrically coupled to the second node N4; a gate electrode of the eleventh control transistor T8 is electrically coupled to the first node N1, a source electrode of the eleventh control transistor T8 is electrically coupled to the high voltage end, a drain electrode of the eleventh control transistor T8 is electrically coupled to the second node N4, and the high voltage end is configured to provide the high voltage VH; and a first end of the third capacitor C3 is electrically coupled to the second node N4, and a second end of the third capacitor C3 is electrically coupled to the high voltage end.

The output circuitry 15 includes a first output transistor T10 and a second output transistor T9. A gate electrode of the first output transistor T10 is electrically coupled to the first node N1, a source electrode of the first output transistor T10 is electrically coupled to the low voltage end, and a drain electrode of the first output transistor T10 is electrically coupled to a light-emission control signal output end EOUT; and a gate electrode of the second output transistor T9 is electrically coupled to the second node N4, a source electrode of the second output transistor T9 is electrically coupled to the high voltage end, and a drain electrode of the second output transistor T9 is electrically coupled to the light-emission control signal output end EOUT.

In the embodiments of the present disclosure, as shown in FIG. 6, all the transistors are, but not limited to, PMOS transistors.

In the embodiments of the present disclosure, as shown in FIG. 6, EOUT provides, but not limited to, a light-emission control signal for the first light-emission control line in the display panel.

As shown in FIG. 6, Co is an output parasitic capacitor, and GND is a grounded end.

Figure 7:
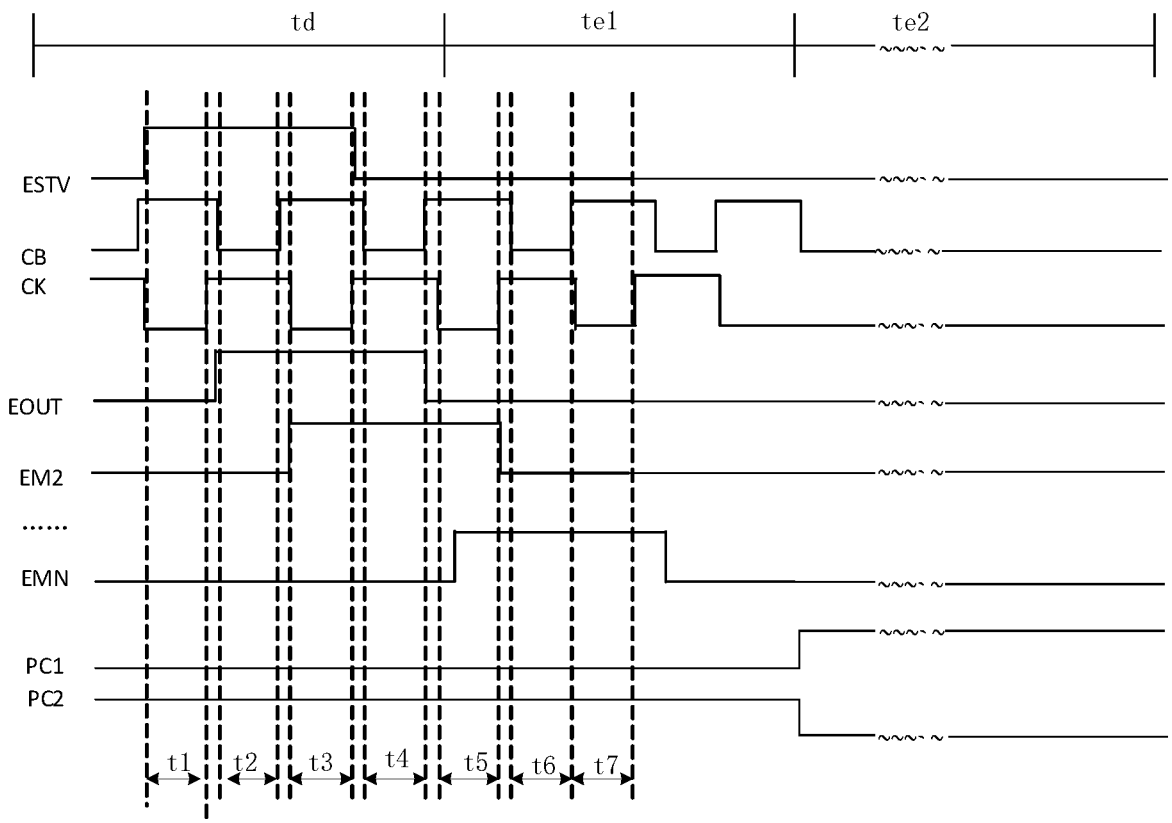
FIG. 7 is a sequence diagram of the light-emission control signal generation circuitry in FIG. 6.
Figure 8A:
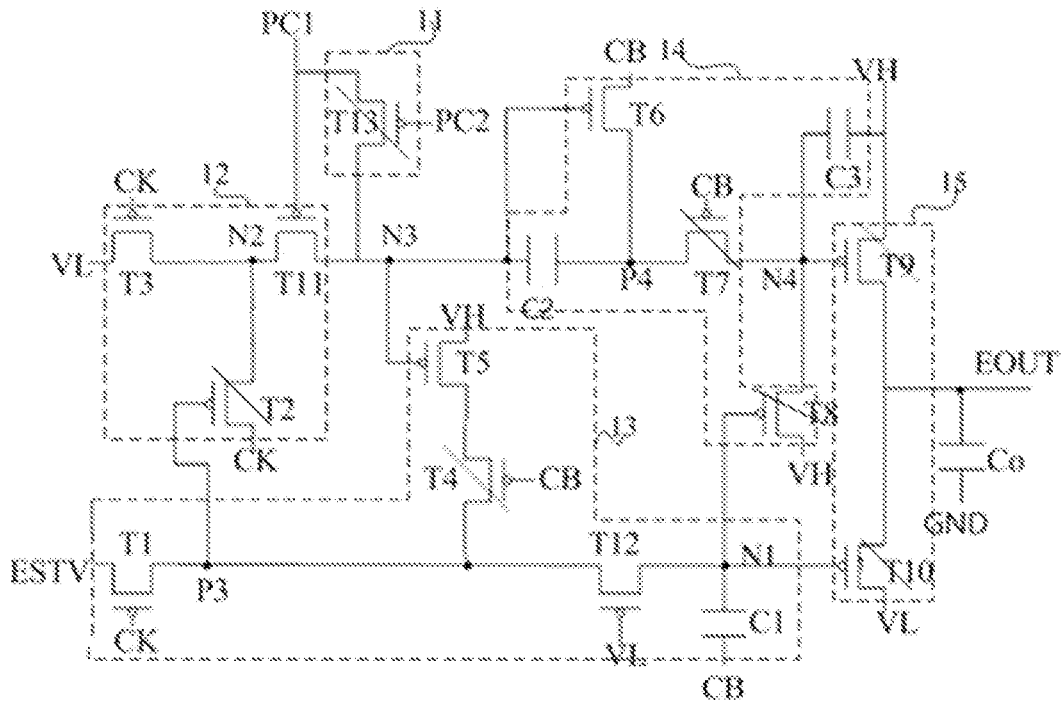
FIG. 8A is a schematic view showing an operation state of the light-emission control signal generation circuitry in FIG. 6 within a first time period t1.

As shown in FIG. 7, in the embodiments of the present disclosure, during the operation of the light-emission control signal generation circuitry in FIG. 6, within a first time period t1, the initial voltage provided by ESTV is changed from a low voltage to a high voltage, CB is a high voltage, and CK is a low voltage, so the potential at N1 is changed from a low voltage to a high voltage, the potential at N2 is a low voltage, the potential at N3 is a low voltage, and the potential at N4 is a high voltage. As shown in FIG. 8A, Ti, T3, T5, T6, T11 and T12 are all turned on, T2, T4, T7, T8, T9, T10 and T13 are all turned off, and the light-emission control signal outputted by EOUT is maintained at a low voltage.

Figure 8B:
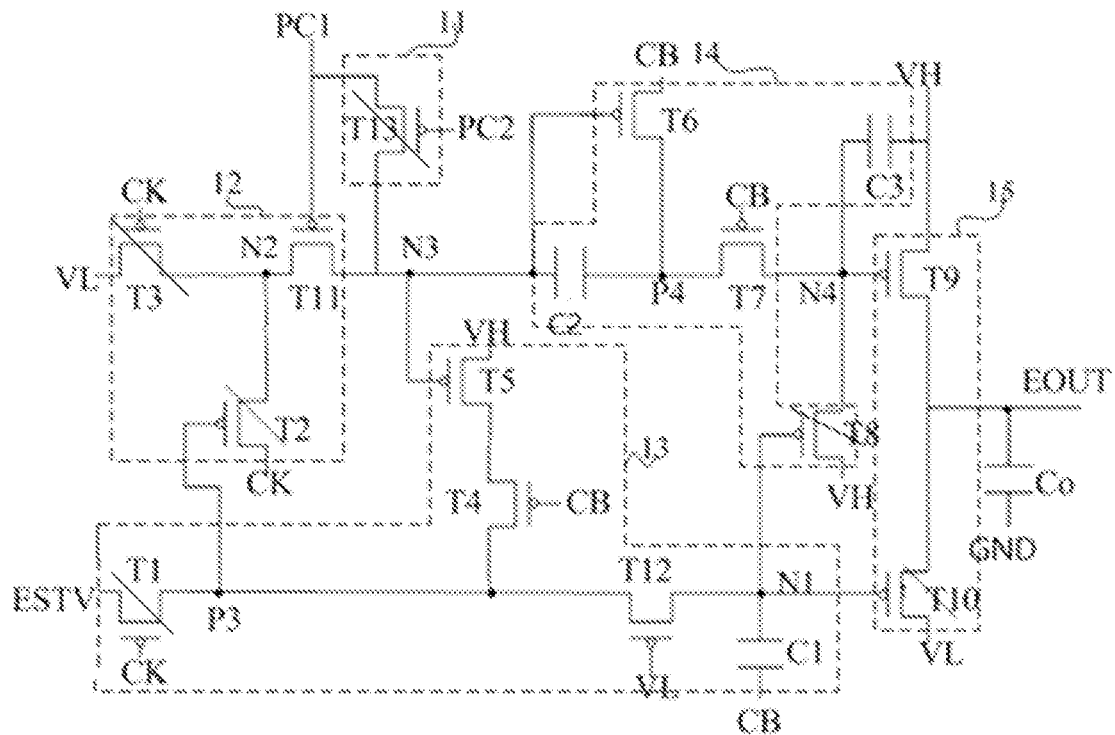
FIG. 8B is a schematic view showing the operation state of the light-emission control signal generation circuitry in FIG. 6 within a second time period t2.

Within a second time period t2, the initial voltage provided by ESTV is maintained at a high voltage, CB is a low voltage, and CK is a high voltage, so the potential at N1 is a high voltage, the potential at N2 is a low voltage, the potential at N3 is a low voltage and the potential at N4 is a low voltage. As shown in FIG. 8B, Ti, T2, T3, T10 and T13 are all turned off, and EOUT outputs a high voltage.

Figure 8C:
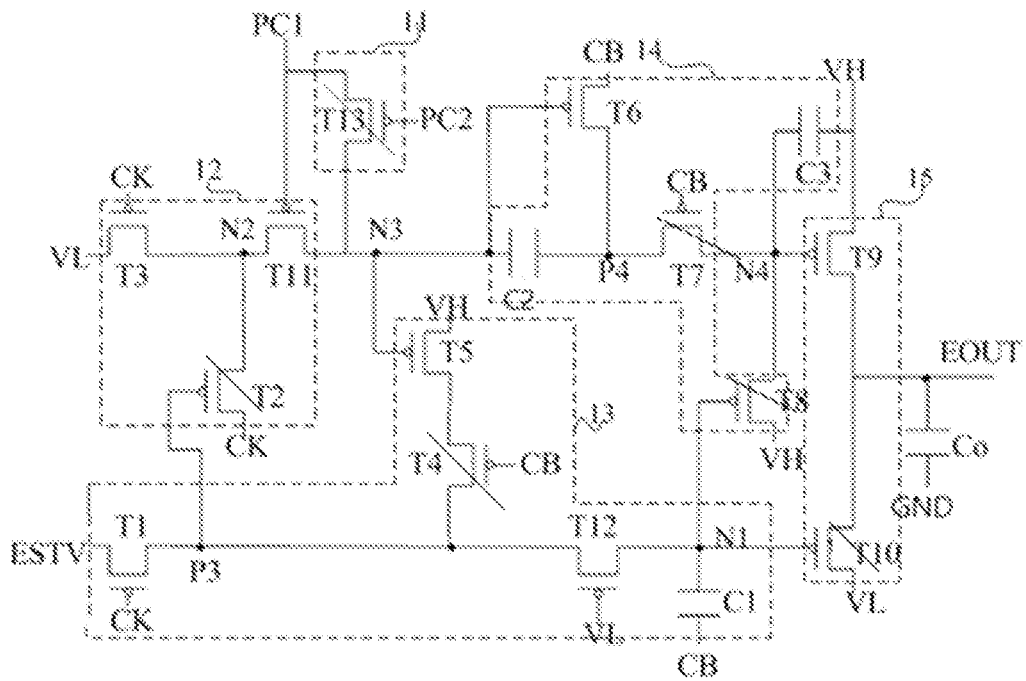
FIG. 8C is a schematic view showing the operation state of the light-emission control signal generation circuitry in FIG. 6 within a third time period t3.

Within a third time period t3, the initial voltage provided by ESTV is maintained at a low voltage, CB is a high voltage, and CK is a low voltage, so the potential at N1 is a high voltage, the potential at N2 is a low voltage, the potential at N3 is a low voltage and the potential at N4 is a low voltage. As shown in FIG. 8C, T2, T4, T7, T8, T10 and T13 are all turned off, and EOUT outputs a high voltage.

Figure 8D:
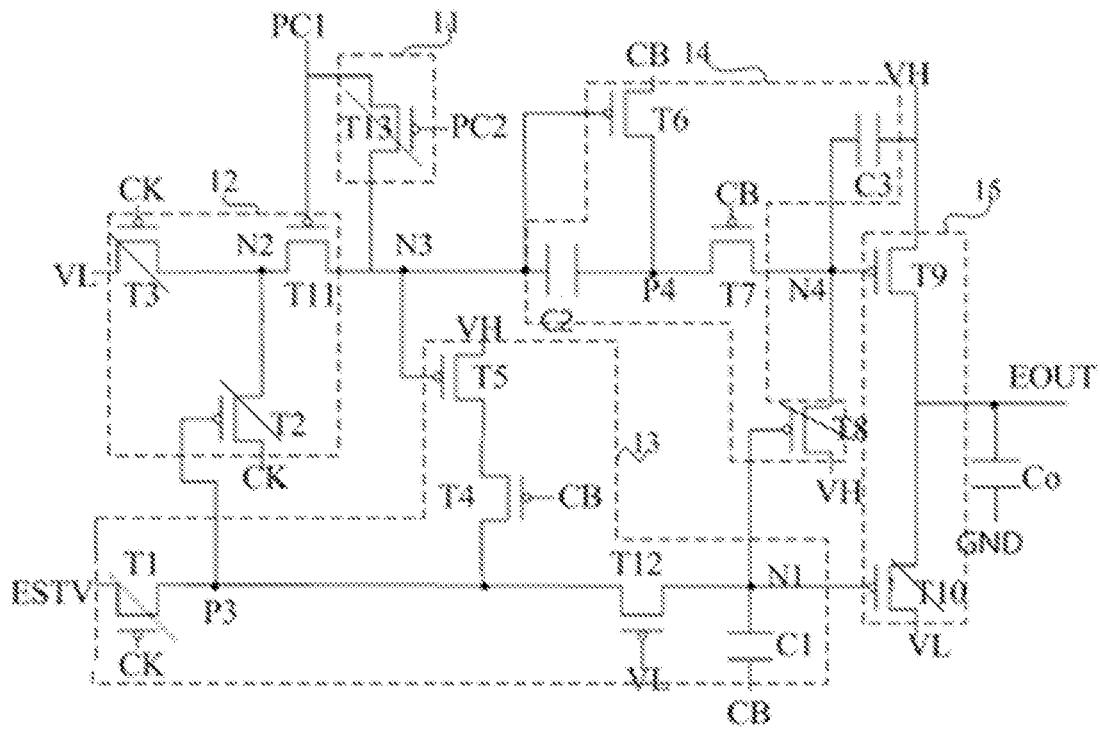
FIG. 8D is a schematic view showing the operation state of the light-emission control signal generation circuitry in FIG. 6 within a fourth time period t4.

Within a fourth time period t4, the initial voltage provided by ESTV is maintained at a low voltage, CB is a low voltage, and CK is a high voltage, so the potential at N1 is a high voltage, the potential at N2 is a high voltage, the potential at N3 is a low voltage, and the potential at N4 is a low voltage. As shown in FIG. 8D, Ti, T2, T3, T8, T10 and T13 are all turned off, and EOUT outputs a high voltage.

Figure 8E:
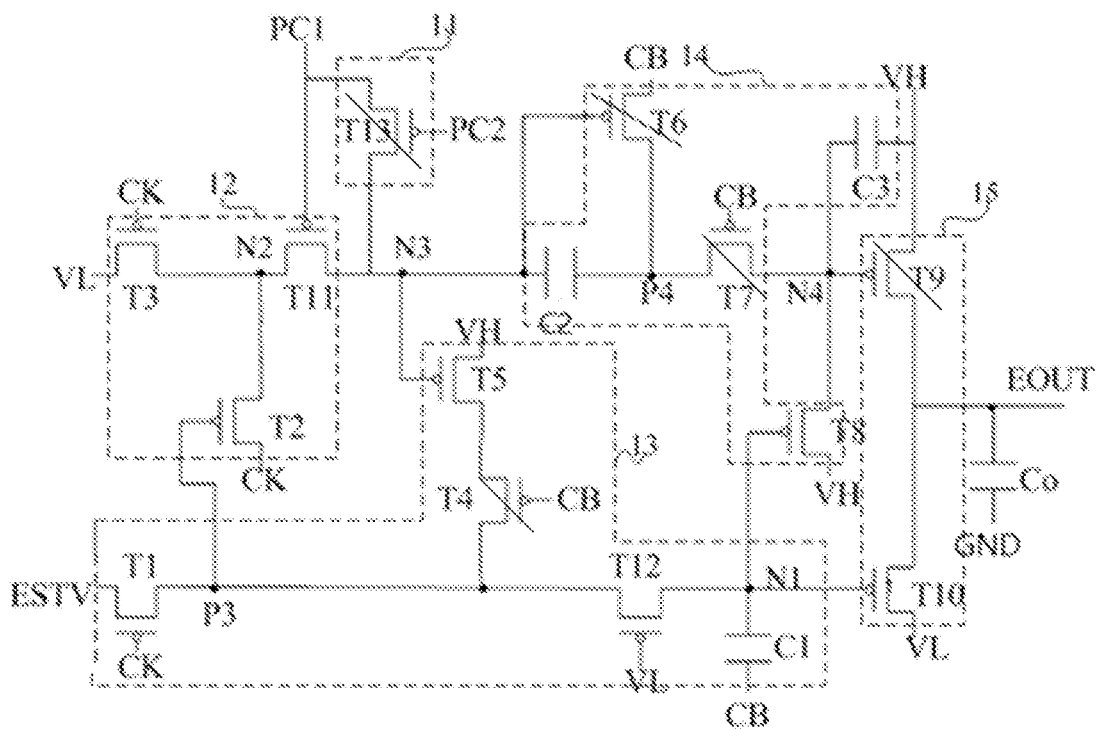
FIG. 8E is a schematic view showing the operation state of the light-emission control signal generation circuitry in FIG. 6 within a fifth time period t5.

Within a fifth time period t5, the initial voltage provided by ESTV is maintained at a low voltage, CB is a high voltage, and CK is a low voltage, so the potential at N1 is a low voltage, the potential at N2 is a low voltage, the potential at N3 is a low voltage, and the potential at N4 is a high voltage. As shown in FIG. 8E, T4, T6, T7, T9 and T13 are all turned off, and EOUT outputs a low voltage.

Figure 8F:
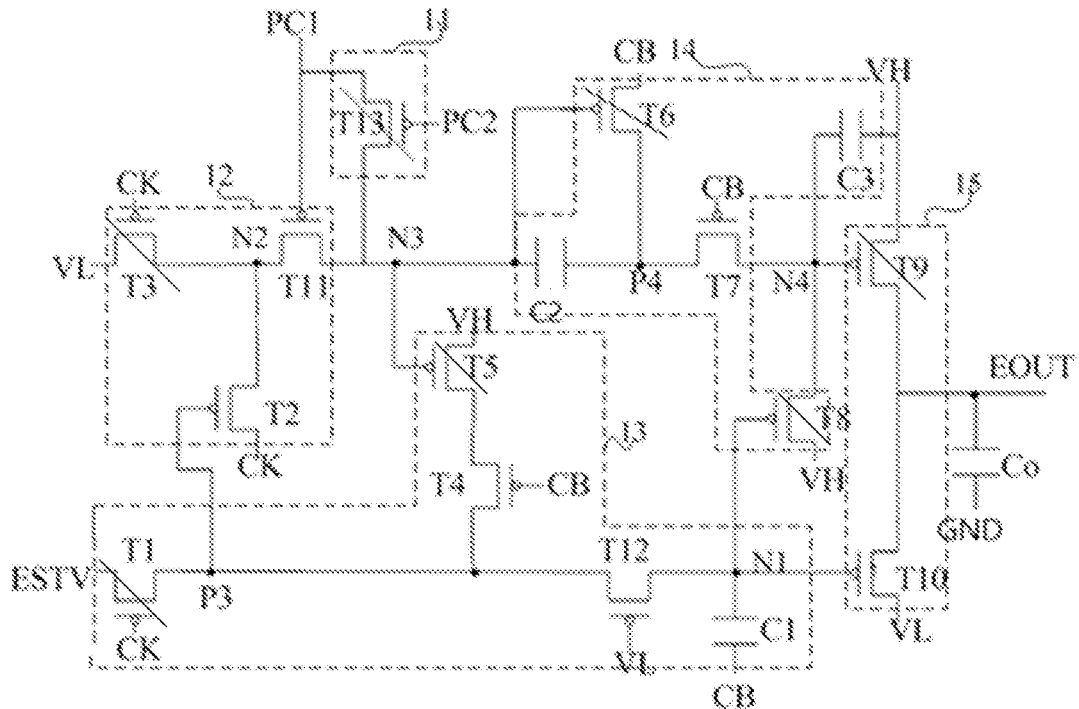
FIG. 8F is a schematic view showing the operation state of the light-emission control signal generation circuitry in FIG. 6 within a sixth time period t6.

Within a sixth time period t6, the initial voltage provided by ESTV is maintained at a low voltage, CB is a low voltage, and CK is a high voltage, so the potential at N1 is a low voltage, the potential at N2 is a high voltage, the potential at N3 is a high voltage, and the potential at N4 is a high voltage. As shown in FIG. 8F, Ti, T3, T5, T6, T9 and T13 are turned off, and EOUT outputs a low voltage.

Figure 8G:
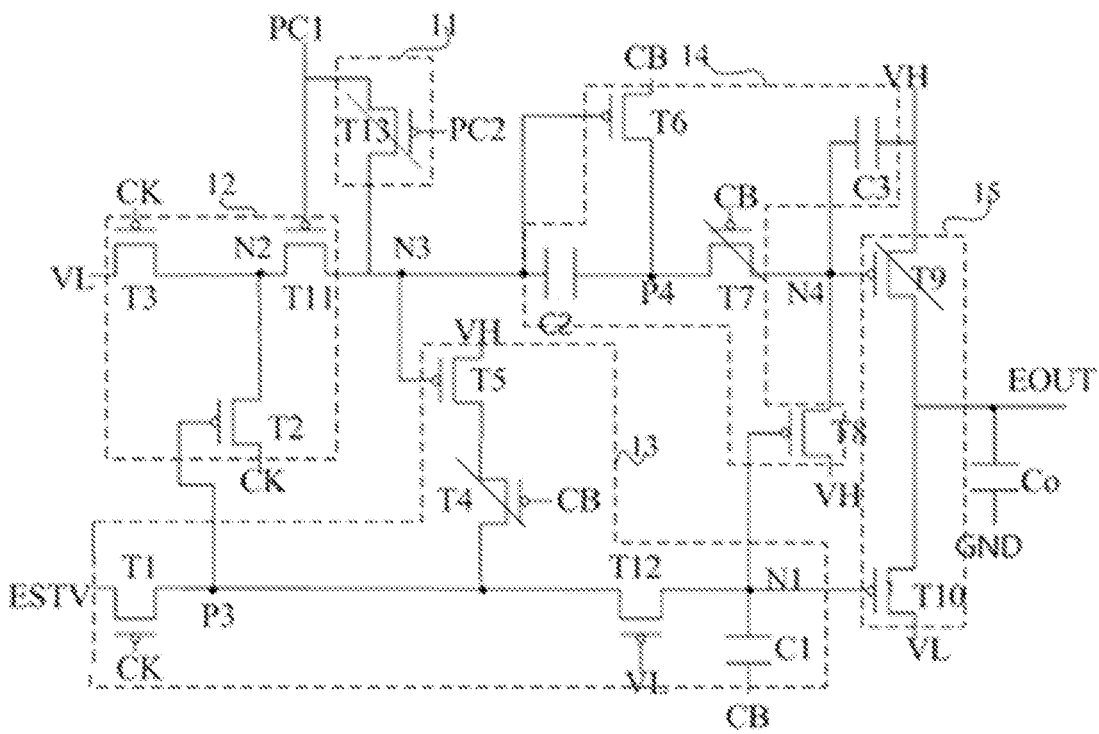
FIG. 8G is a schematic view showing the operation state of the light-emission control signal generation circuitry in FIG. 6 within a seventh time period t7.

Within a seventh time period t7, the initial voltage provided by ESTV is maintained at a low voltage, CB is a high voltage, and CK is a low voltage, so the potential at N1 is a low voltage, the potential at N2 is a low voltage, the potential at N3 is a low voltage, and the potential at N4 is a high voltage. As shown in FIG. 8G, T4, T7, T9 and T13 are turned off, and EOUT outputs a low voltage.

Subsequently, the potential at N1 is maintained at a low voltage, the potential at N4 is maintained at a high voltage, and EOUT outputs a low voltage. During the low frequency operation, the light-emission control transistor is turned on for a long time, and EOUT continuously outputs a low voltage for a long time. Within a time period where EOUT continuously outputs the low voltage, CK and CB are changed into direct current voltage signals, and T13 is added to ensure the output stability of the light-emission control signal.

As shown in FIG. 7, EM2 is a light-emission control signal on a second light-emission control line in the display panel, and EMN is a light-emission control signal on an $N^{th}$ light-emission control line in the display panel, where N is a positive integer. The display panel includes N light-emission controlling lines. As shown in FIG. 7, td is a compensation time period, te1 is an enabling stage, and te2 is the first stage. At te2, the potential at PC1 is a high voltage, and the potential at PC2 is a low voltage; at te2, the plurality of light-emission control lines in the display panel is enabled, and EM1 to EMN output low voltages; and at the enabling stage te1, light-emission control lines are sequentially enabled.

As shown in FIG. 7, the compensation time period td includes the first time period t1, the second time period t2, the third time period t3 and the fourth time period t4, and the sequential turn-on stage te1 includes the fifth time period t5, the sixth time period t6 and the seventh time period t7.

As shown in FIG. 7, in the embodiments of the present disclosure, during the operation of the light-emission control signal generation circuitry in FIG. 6, at the first stage te2, the initial voltage provided by ESTV is a low voltage, CB and CK are direct current low voltage signals, the potential at PC1 is a high voltage, the potential at PC2 is a low voltage, so T11 is turned off, T13 is turned on, and T5, T6 and T9 are turned off. At this time, the potential at N1 is a low voltage level, the potential at N2 is a low voltage, the potential at N3 is a high voltage, the potential at N4 is a high voltage, and EOUT outputs a low voltage, thereby to maintain the stability of the output waveform.

Figure 9:
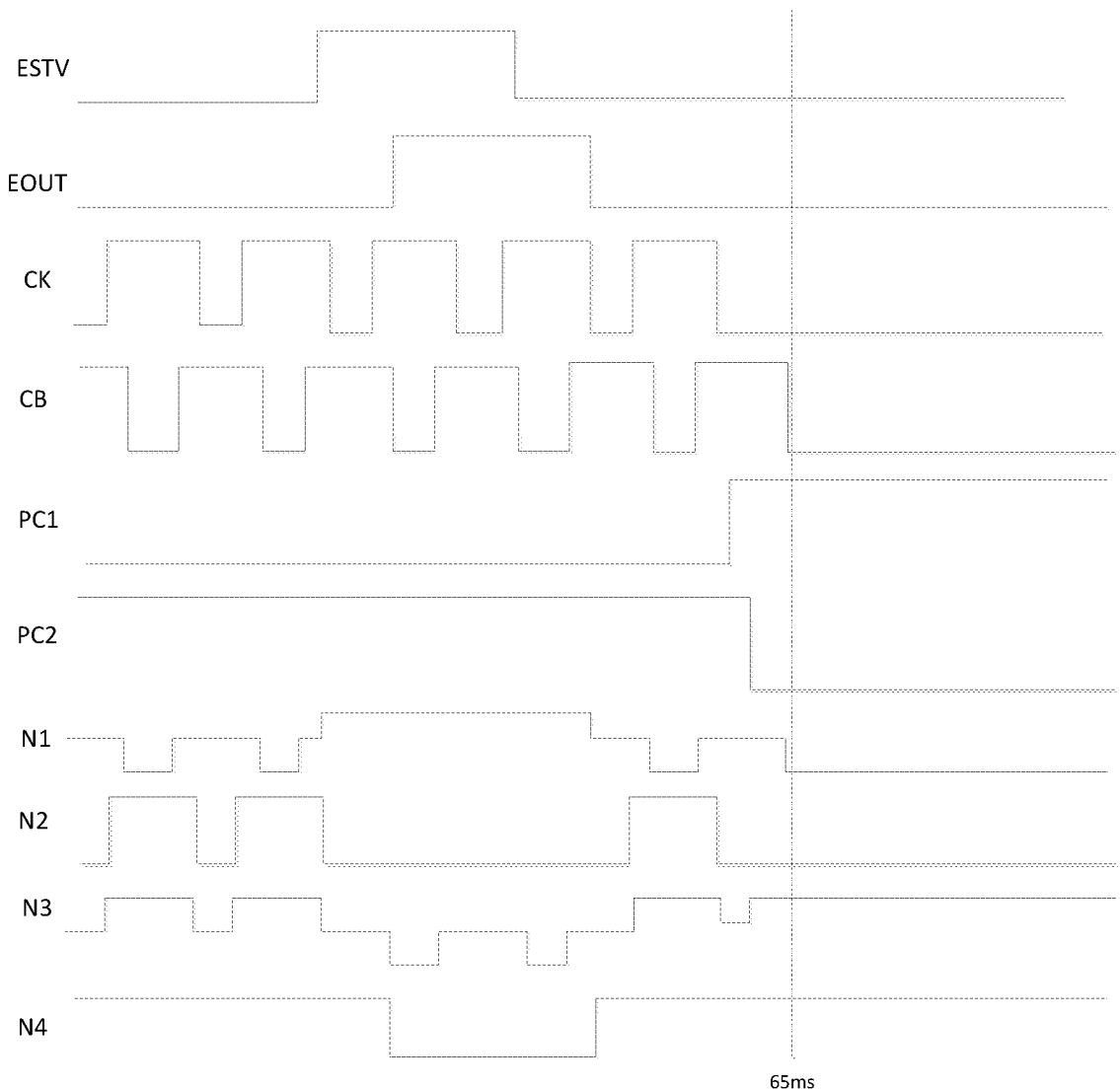
FIG. 9 is a simulation sequence diagram of the light-emission control signal generation circuitry in FIG. 6.

FIG. 9 shows a simulation sequence diagram of the light-emission control signal generation circuitry in FIG. 6. According to a simulation result, after 65 ms, CK and CB are changed into direct current low voltage signals, without any change in the output waveform of EOUT. At the same time, the potential at N1 is maintained at a low voltage and the potential at N4 is maintained at a high voltage, thereby to maintain the stability of the output waveform.

The present disclosure further provides in some embodiments a light-emission control signal generation method for the above-mentioned light-emission control signal generation circuitry. A display period includes a light-emitting time period, and the light-emitting time period includes a first stage. The light-emission control signal generation method includes, at the first stage, enabling the first clock signal and the second clock signal to be direct current voltage signals, controlling, by the first control node control circuitry, the potential at the first control node to be the first voltage, controlling, by the second control node control circuitry, the second control node to be electrically decoupled from the first control node, controlling, by the first node control circuitry, the potential at the first node to be the second voltage under the control of the potential at the first control node, controlling, by the second node control circuitry, the potential at the second node to be the first voltage under the control of the potential at the first control node and the potential at the first node, and controlling, by the output circuitry, a potential of the light-emission control signal to be an effective potential under the control of the potential at the first node and the potential at the second node.

According to the light-emission control signal generation method in the embodiments of the present disclosure, through the first control node control circuitry, it is able to output the light-emission control signal stably at the first stage when the potential at the first clock signal and the second clock signal are changed into direct current voltage signals, thereby to reduce the power consumption while ensuring the output stability of the light-emission control signal.

The present disclosure further provides in some embodiments a display device, which includes the above-mentioned light-emission control signal generation circuitry.

The display device may be any product or member having a display function, such as a mobile phone, a tablet computer, a television, a monitor, a laptop computer, a digital photo frame, or a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light-emission control signal generation circuitry, comprising: a first control node control circuitry, a second control node control circuitry, a first node control circuitry, a second node control circuitry and an output circuitry, wherein
the first control node control circuitry is configured to control a potential at a first control node to be a first voltage;
the second control node control circuitry is configured to control a second control node to be electrically coupled to or electrically decoupled from the first control node;
the first node control circuitry is configured to control a potential at a first node under the control of the potential at the first control node;
the second node control circuitry is configured to control a potential at a second node under the control of the potential at the first control node and the potential at the first node; and
the output circuitry is configured to generate a light-emission control signal under the control of the potential at the first node and the potential at the second node.

2. The light-emission control signal generation circuitry according to claim 1, wherein the first control node control circuitry comprises a first control transistor;
a control electrode of the first control transistor is electrically coupled to a first control end, a first electrode of the first control transistor is electrically coupled to a second control end or a first voltage end, and a second electrode of the first control transistor is electrically coupled to the first control node; and
the first control transistor is a p-type transistor.

3. The light-emission control signal generation circuitry according to claim 2, wherein the first control transistor is turned on to control the potential at the first control node to be the first voltage of a high voltage when the first control end provides a low voltage signal and the second control end or the first voltage end provides a high voltage signal.

4. The light-emission control signal generation circuitry according to claim 2, wherein the second control node control circuitry is further configured to write a second voltage signal into the second control node under the control of a first clock signal, and write the first clock signal into the second control node under the control of a potential at a third node.

5. The light-emission control signal generation circuitry according to claim 3, wherein the second control node control circuitry is further configured to write a second voltage signal into the second control node under the control of a first clock signal, and write the first clock signal into the second control node under the control of a potential at a third node.

6. The light-emission control signal generation circuitry according to claim 2, wherein the first node control circuitry is configured to write an initial voltage into the third node under the control of the first clock signal, write the first voltage into the third node under the control of the potential at the first control node and a second clock signal, control the third node to be electrically coupled to the first node under the control of the second voltage signal, and control the potential at the first node in accordance with the second clock signal.

7. The light-emission control signal generation circuitry according to claim 1, wherein the first control node control circuitry comprises a first control transistor;
a control electrode of the first control transistor is electrically coupled to a second control end, a first electrode of the first control transistor is electrically coupled to a first voltage end, and a second electrode of the first control transistor is electrically coupled to the first node; and the first control transistor is an n-type transistor.

8. The light-emission control signal generation circuitry according to claim 7, wherein the first control transistor is turned on to control the potential at the first control node to be the first voltage of a high voltage when the second control end provides a high voltage signal and the first voltage end provides a high voltage signal.

9. The light-emission control signal generation circuitry according to claim 7, wherein the second control node control circuitry is further configured to write a second voltage signal into the second control node under the control of a first clock signal, and write the first clock signal into the second control node under the control of a potential at a third node.

10. The light-emission control signal generation circuitry according to claim 8, wherein the second control node control circuitry is further configured to write a second voltage signal into the second control node under the control of a first clock signal, and write the first clock signal into the second control node under the control of a potential at a third node.

11. The light-emission control signal generation circuitry according to claim 1, wherein the second control node control circuitry is further configured to write a second voltage signal into the second control node under the control of a first clock signal, and write the first clock signal into the second control node under the control of a potential at a third node.

12. The light-emission control signal generation circuitry according to claim 11, wherein the second control node control circuitry comprises a second control transistor, a third control transistor, and a fourth control transistor;

a control electrode of the second control transistor is electrically coupled to the second control end, a first electrode of the second control transistor is electrically coupled to the second control node, and a second electrode of the second control transistor is electrically coupled to the first control node;

a control electrode of the third control transistor is electrically coupled to a first clock signal end, a first electrode of the third control transistor is electrically coupled to a second voltage end, and a second electrode of the third control transistor is electrically coupled to the second control node; and a control electrode of the fourth control transistor is electrically coupled to the third node, a first electrode of the fourth control transistor is electrically coupled to the first clock signal end, and a second electrode of the fourth control transistor is electrically coupled to the second control node.

13. The light-emission control signal generation circuitry according to claim 12, wherein the second control transistor is turned off to control the second control node to be electrically decoupled from the first control node when the first control end provides a low voltage signal and the second control end provides a high voltage signal; and the second control transistor is further turned on to control the second control node to be electrically coupled to the first control node when the first control end provides a high voltage signal and the second control end provides a low voltage signal.

14. The light-emission control signal generation circuitry according to claim 1, wherein the first node control circuitry is configured to write an initial voltage into the third node under the control of the first clock signal, write the first voltage into the third node under the control of the potential at the first control node and a second clock signal, control the third node to be electrically coupled to the first node under the control of the second voltage signal, and control the potential at the first node in accordance with the second clock signal.

15. The light-emission control signal generation circuitry according to claim 14, wherein the first node control circuitry comprises a fifth control transistor, a sixth control transistor, a seventh control transistor, an eighth control transistor and a first capacitor;

a control electrode of the fifth control transistor is electrically coupled to the first clock signal end, a first electrode of the fifth control transistor is electrically coupled to an initial voltage end, and a second electrode of the fifth control transistor is electrically coupled to the third node;

a control electrode of the sixth control transistor is electrically coupled to a second clock signal end, and a first electrode of the sixth control transistor is electrically coupled to the third node;

a control electrode of the seventh control transistor is electrically coupled to the first control node, a first electrode of the seventh control transistor is electrically coupled to a second electrode of the sixth control transistor, and a second electrode of the seventh control transistor is electrically coupled to the first voltage end;

a control electrode of the eighth control transistor is electrically coupled to the second voltage end, a first electrode of the eighth control transistor is electrically coupled to the third node, and a second electrode of the eighth control transistor is electrically coupled to the first node; and a first end of the first capacitor is electrically coupled to the first node, and a second end of the first capacitor is electrically coupled to the second clock signal end.

16. The light-emission control signal generation circuitry according to claim 1, wherein the second node control circuitry is configured to control a potential at a fourth node in accordance with the potential at the first control node, write the second clock signal into the fourth node under the control of the potential at the first control node, control the fourth node to be electrically coupled to the second node under the control of the second clock signal, write the first voltage signal into the second node under the control of the potential at the first node, and maintain the potential at the second node.

17. The light-emission control signal generation circuitry according to claim 16, wherein the second node control circuitry comprises a second capacitor, a ninth control transistor, a tenth control transistor, an eleventh control transistor and a third capacitor, wherein a first end of the second capacitor is electrically coupled to the first control node, and a second end of the second capacitor is electrically coupled to the fourth node;

a control electrode of the ninth control transistor is electrically coupled to the first control node, a first electrode of the ninth control transistor is electrically coupled to the second clock signal end, and a second electrode of the ninth control transistor is electrically coupled to the fourth node;

a control electrode of the tenth control transistor is electrically coupled to the second clock signal end, a first electrode of the tenth control transistor is electrically coupled to the fourth node, and a second electrode of the tenth control transistor is electrically coupled to the second node;

a control electrode of the eleventh control transistor is electrically coupled to the first node, a first electrode of the eleventh control transistor is electrically coupled to the first voltage end, and a second electrode of the eleventh control transistor is electrically coupled to the second node; and a first end of the third capacitor is electrically coupled to the second node, and a second end of the third capacitor is electrically coupled to the first voltage end.

18. The light-emission control signal generation circuitry according to claim 1, wherein the output circuitry comprises a first output transistor and a second output transistor;

a control electrode of the first output transistor is electrically coupled to the first node, a first electrode of the first output transistor is electrically coupled to the second voltage end, and a second electrode of the first output transistor is electrically coupled to a light-emission control signal output end; and a control electrode of the second output transistor is electrically coupled to the second node, a first electrode of the second output transistor is electrically coupled to the first voltage end, and a second electrode of the second output transistor is electrically coupled to the light-emission control signal output end.

19. A light-emission control signal generation method for the light-emission control signal generation circuitry according to claim 1, wherein a display period comprises a light-emitting time period, and the light-emitting time period comprises a first stage, wherein the light-emission control signal generation method comprises, at the first stage, enabling the first clock signal and the second clock signal to be direct current voltage signals, controlling, by the first control node control circuitry, the potential at the first control node to be the first voltage, controlling, by the second control node control circuitry, the second control node to be electrically decoupled from the first control node, controlling, by the first node control circuitry, the potential at the first node to be the second voltage under the control of the potential at the first control node, controlling, by the second node control circuitry, the potential at the second node to be the first voltage under the control of the potential at the first control node and the potential at the first node, and controlling, by the output circuitry, a potential of the light-emission control signal to be an effective potential under the control of the potential at the first node and the potential at the second node.

20. A display device, comprising the light-emission control signal generation circuitry according to claim 1.

* * * * *